United States Patent [19]

Sammells

[11] Patent Number: 4,668,593
[45] Date of Patent: May 26, 1987

[54] SOLVATED ELECTRON LITHIUM ELECTRODE FOR HIGH ENERGY DENSITY BATTERY

[75] Inventor: Anthony F. Sammells, Naperville, Ill.

[73] Assignee: Eltron Research, Inc., Aurora, Ill.

[21] Appl. No.: 902,304

[22] Filed: Aug. 29, 1986

[51] Int. Cl.$^4$ .............................................. H01M 6/18
[52] U.S. Cl. ................................... 429/191; 429/193; 429/196; 429/201; 429/218
[58] Field of Search ............... 429/191, 193, 194, 196, 429/197, 199, 201, 218, 101

[56] References Cited

U.S. PATENT DOCUMENTS

| | | | |
|---|---|---|---|
| 4,009,052 | 2/1977 | Whittingham | 429/191 |
| 4,357,215 | 11/1982 | Goodenough et al. | 429/194 X |
| 4,423,125 | 12/1983 | Basu | 429/194 |
| 4,495,258 | 1/1985 | Mehaute et al. | 429/103 |
| 4,560,630 | 12/1985 | Salomon | 429/194 |

Primary Examiner—Anthony Skapars
Attorney, Agent, or Firm—Thomas W. Speckman; Ann W. Speckman

[57] ABSTRACT

A solvated electron lithium electrode comprising a solution of lithium dissolved in liquid ammonia is provided for use in rechargeable high energy density lithium-based cells utilizing a lithium ion conducting solid electrolyte to separate the liquid solvated negative electrode from liquid positive electroactive material or electrolyte. The rechargeable lithium-based cell according to the present invention reduces coulombic efficiency losses associated with surface morphological changes at a solid lithium electrode, and is suitable for electrical vehicle propulsion and load leveling applications.

30 Claims, 4 Drawing Figures

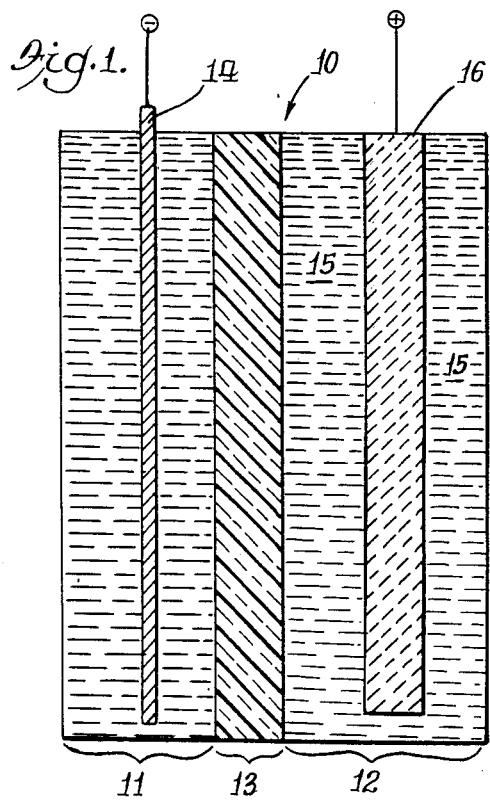
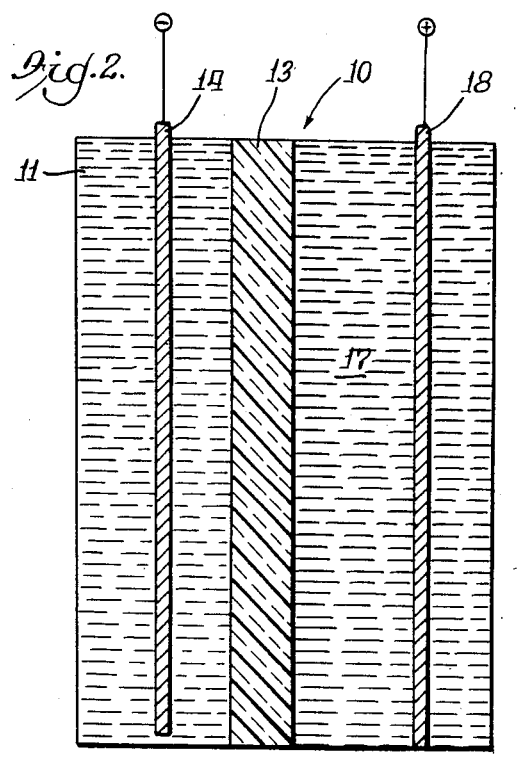
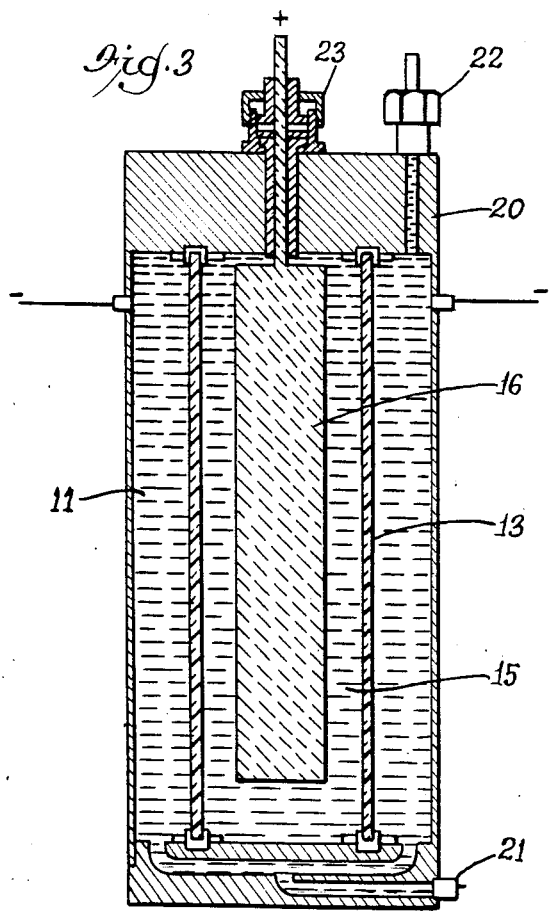
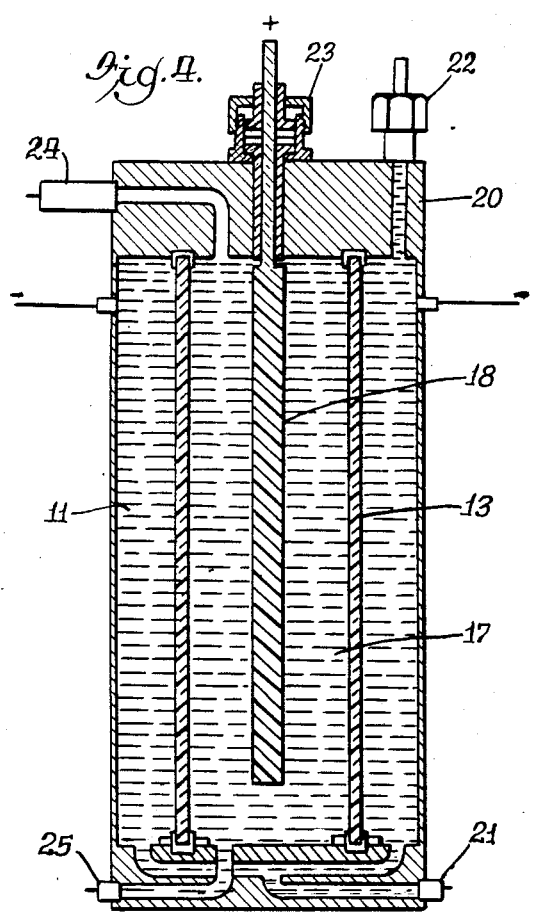

SOLVATED ELECTRON LITHIUM ELECTRODE FOR HIGH ENERGY DENSITY BATTERY

This invention was made as a result of work under NSF-SBIR Contract No. ISI-8560663 awarded by the National Science Foundation. The Government has certain rights in this invention.

BACKGROUND OF THE INVENTION

1. Field of the Invention

The present invention relates to a solvated electron lithium electrode comprising a solution of lithium dissolved in liquid ammonia. The solvated electron lithium electrode is suitable for use in a rechargeable high energy density cell or battery utilizing a solid lithium ion conducting electrolyte to separate the liquid solvated electron negative electrode from either (i) a solid positive electrode in liquid electrolyte, or (ii) liquid positive electroactive material comprising a positive electrode depolarizing agent.

2. Description of the Prior Art

Secondary cells utilizing essentially pure lithium electrodes as negative electrodes with lithium ion conducting non-aqueous electrolytes generally exhibit less than Faradaic cycling efficiency. Lithium electrodes are prone to undergo surface morphological changes during electrochemical cycling which lower the overall coulombic efficiency of the cell. The reduction in coulombic efficiency represents an irreversible loss in lithium capacity after each cell cycle. During cell charging, electrodeposited lithium reacts with the non-aqueous electrolyte to form an insulating film at the lithium electrode/electrolyte interface. This electrochemically deposited lithium film is non-uniform and dendritic areas develop which become electrically isolated from the lithium negative active material. During subsequent discharge, lithium particles become susceptible to mechanical removal from the electrode without contributing to the overall Faradaic charge capacity of the electrode. Lithium particles lost in this manner are generally unavailable for further cell cycling. This type of irreversible lithium loss due to morphological changes at the lithium electrode/non-aqueous electrolyte interface region occurs when unit activity lithium is deposited during electrode charge.

Electrodes consisting of intercalation compounds for high energy density batteries, and the importance of intercalation compounds in solid state chemistry is known. See, e.g., M. B. Armand, "Intercalation Electrodes", *Material for Advanced Batteries*, D. W. Murphy, J. Broadhead, eds., Nato Conference Series VI, p. 145 (1979). Intercalation compounds undergo topochemical reactions involving the insertion of a guest into the intercalation compound host lattice structure with minimal structural changes by topotactic electron/ion transfer. Intercalation reactions are generally completely reversible at ambient temperatures and pressures, and therefore utilization of intercalation compounds in secondary cells is very promising.

Lithiated rutiles have been utilized as electrodes in echargeable electrochemical cells. The topochemical lithiation of rutile related structures in non-aqueous lithium electrochemical cells is taught in D. W. Murphy et al, "Topochemical Reactions of Rutile Related Structures with Lithium", Mat. Res. Bull. Vol. 13, 1395 (1978). This article. relates to the use of transition metal chalcogenides, oxides and oxyhalides as host structures suitable for use as cathodes in room temperature batteries utilizing lithium as the guest. Rutile related metal dioxides, in particular, exhibit a range of important parameters for lithium incorporation which suggest their suitability in high energy density battery applications, such as the range of size and vacancy for lithium, diffusion pathway, electronic conductivity, and crystallographic distortion.

One researcher suggests that intercalation of lithium ions may be achieved by reaction of the host lattice with a lithium/ammonia solution to provide an intercalated solid electrode. R. Schollhorn, "Reversible Topotactic Redox Reactions of Solids by Electron/Ion Transfer", Angew. Chem. Int. Ed. Engl. 19:983 (1980). This article also teaches that much experimental work has been conducted with $Li/TiS_2$ cells having a solid lithium anode and $TiS_2$ layered dichalcogenide cathode. The role of ternary phases in lithium anodes and cathodes comprising metallic halide, oxide and chalcogenide intercalation compounds is elucidated in M.S. Whittingham, "The Role of Ternary Phases in Cathode Reactions", J. Electrochem. Soc.; 123:315 (1976).

Cells have also been proposed having two intercalation electrodes, each intercalation electrode having a different lithium activity. M. Lazzari and B. Scrosati, "A Cyclable Lithium Organic Electrolyte Cell Based on Two Intercalation Electrodes", J. Electrochem. Soc.; 127:773 (1980).

Solutions of alkali and alkaline earth metals in liquid ammonia are known to exhibit high ionic and electronic conductivity, and utilization of such materials in galvanic cells has been proposed. Dilute solutions of lithium or sodium in ammonia have a characteristic deep blue color, and the solution takes on a bronze or metallic appearance at greater concentrations. According to the solvated electron model, an electron is removed from the alkali or alkaline earth metal and resides in cavities created by the association of several ammonia molecules. The ammoniated electrons are considered to be associated with molecular orbitals located on the ammonia protons.

In general, the technical obstacle to the application of electroactive solvated electron solutions in rechargeable galvanic cells has been the difficulty in providing appropriate containment of the solvated electron solution. Separation of the solvated electron solutions from positive electroactive materials and electrolyte while maintaining low internal resistance is important in high energy density battery applications.

Ambient temperature secondary batteries using a solvated electron electrode comprising sodium or sulfur dissolved in liquid ammonia have been developed. J. Bennett et al, "The Solvated Electron Battery", 18th IECEC Meeting 1665 (1983). Secondary cells containing sodium solvated electron solutions utilizing a sodium ion conducting solid electrolyte, such as $\beta''$-alumina electrolyte, have unacceptably low ionic conductivity at ambient temperatures, and require high operating temperatures. Cells were also developed using a solvated electron sulfur electrode with a sulfinated styrene separator which demonstrated poor containment.

Studies relating to the self-decomposition reaction of concentrated solutions of lithium and ammonia at atmospheric pressure are reported in M. H. Miles and W. S. Harris, "Decomposition Reaction of Concentrated Lithium-Ammonia Solutions", J.Electrochem. Soc., 21:459 (1974). This publication suggests that solutions of lithium in liquid ammonia could provide an interesting electrochemical fuel for fuel cells or batteries. In the absence of an enclosed vessel, lithium/ammonia solutions slowly decompose by the reaction:

$$Li(NH_3)_x \rightarrow LiNH_2 + (x-1)NH_3(g) + \tfrac{1}{2}H_2(g)$$

as a consequence of the continuous removal of gaseous ammonia and hydrogen. In an enclosed (pressurized) environment, however, this reaction is reversible and decomposition is arrested.

SUMMARY OF THE INVENTION

It is an object of the present invention to provide a solvated electron lithium electrode comprising lithium dissolved in liquid ammonia.

It is another object of the present invention to provide a rechargeable high energy density lithium-based cell which demonstrates reduced coulombic efficiency losses associated with surface morphological changes of a solid lithium electrode.

It is another object of the present invention to provide a high energy density secondary cell utilizing a solvated electron lithium negative electrode, solid lithium ion conducting electrolyte, and a solid positive electrode in a positive electrode compartment containing a liquid lithium ion conducting electrolyte which achieves high coulombic efficiencies during electrochemical cell cycling.

It is another object of the present invention to provide a high energy density secondary cell utilizing a solvated electron lithium negative electrode, solid lithium ion conducting electrolyte and liquid lithium ion conducting positive electroactive material which achieves high coulombic efficiencies during electrochemical cell cycling.

It is yet another object of the present invention to provide lithium-based high power and high energy density secondary batteries which operate under pressure and at close to ambient temperatures.

The solvated electron lithium negative electrode of the present invention comprises lithium dissolved in liquid ammonia to give a solvated electron solution. Lithium is soluble in liquid ammonia solutions at concentrations of about 0.1 M to about 7.75 M at ambient temperatures. In the context of this disclosure and the appended claims, the terminology "solvated electron solution" includes solutions of lithium in ammonia at concentrations of about 0.1 M to about 7.75 M and includes bronze solutions. The solvated electron lithium/ammonia solution provides a source of lithium for electrochemical cycling in lithium-based cells.

The high energy density cell of the present invention, in one embodiment, comprises a solvated electron lithium negative electrode, solid lithium ion conducting electrolyte, and a solid lithium intercalating positive electrode in a positive electrode compartment containing lithium ion conducting liquid electrolyte. Lithium ion conducting solid electrolytes which are known to the art may be utilized in cells comprising a solvated electron lithium electrode according to the present invention. Lithium ion conducting liquid electrolyte is provided between the solid electrolyte and the solid positive electrode in a positive electrode compartment. Suitable liquid electrolyte comprises a lithium ion conducting supporting electrolyte dissolved in a non-aqueous solvent. Suitable solid positive electrodes for use in the positive electrode compartment, such as transition metal chalcogenides, oxides, oxyhalides and the like, are known to the art.

According to another embodiment of the present invention, the high energy density cell comprises a solvated electron lithium negative electrode, solid lithium ion conducting electrolyte, and liquid, lithium ion conducting positive active material, with separation of the liquid negative active material from direct contact with the liquid positive electroactive material provided by the lithium ion conducting solid electrolyte. Suitable liquid positive electroactive materials comprise liquid depolarizing agents such as $SO_2$, $SO_2Cl_2$, and $SOCl_2$, and a lithium ion conducting supporting electrolyte dissolved in a non-aqueous solvent. In a preferred embodiment, the liquid positive electroactive material incorporates a dissolved transition metal halide, such as $CuCl_2$. When liquid positive electroactive materials are used, a current collector is preferably provided in the positive electrode compartment.

According to a preferred embodiment of the present invention, the solvated electron $Li,NH_3$ solution is under pressure in an enclosed negative electrode compartment. Sealing of the solvated $Li,NH_3$ solution from the atmosphere in this fashion prevents decomposition of the solvated $Li,NH_3$ solution and evaporation of liquid ammonia, and also results in pressurized operation at the negative electrode compartment. Pressures of about 3 to about 8 atm during electrochemical cell cycling are preferred in the sealed negative electrode compartment according to this embodiment. Equivalent operating pressures may be applied to the positive electrode compartment during electrochemical cell cycling, but application of equivalent pressure is not necessary in all cases. Cells according to the present invention comprising a solvated electron lithium electrode may be operated at temperatures of from about $-33°$ C. to about $50°$ C., and are preferably operated at temperatures as close to ambient temperatures as possible.

Use of the solvated electron secondary lithium electrode comprising a solvated lithium/ammonia solution according to the present invention provides greater versatility in battery geometry, can produce high current densities at ambient temperatures with the solvated electron solution sealed from the atmosphere, and is operable at essentially theoretical coulombic efficiencies.

BRIEF DESCRIPTION OF THE DRAWING

Further features of the invention will be apparent from the following more detailed description taken in conjunction with the following drawings, in which:

FIG. 1 shows a highly schematic sectional view of a cell according to the present invention utilizing a solid positive electrode;

FIG. 2 shows a highly schematic sectional view of a cell according to the present invention utilizing liquid positive electroactive material;

FIG. 3 shows a schematic sectional view of a cell of the present invention having an enclosed cell configuration and utilizing a solid positive electrode; and FIG. 4 shows a schematic sectional view of a cell of the present invention having an enclosed cell configuration and utilizing liquid positive electroactive material.

DESCRIPTION OF PREFERRED EMBODIMENTS

As shown schematically in FIG. 1, high energy density cell 10 comprises negative electrode 11, positive electrode compartment 12, and solid lithium ion conducting electrolyte 13 disposed between the electrodes and in contact therewith. Negative electrode 11 comprises a solvated electron lithium electrode with solvated lithium/ammonia solution, which is preferably provided in an enclosed volume. Lithium is present in solvated electron lithium negative electrode 11 at concentrations of about 0.1 M to about 7.75 M, and preferably at concentrations of about 1.0 M to about 3.5 M. Current-collector 14 may be arranged in solvated solution negative electrode 11, but provision of a current collector is not required for all applications, since the solvated lithium/ammonia solution is an excellent electronic conductor. Current collector 14 preferably comprises carbon, low carbon stainless steel, or any other material which possesses good electronic conductivity and is stable in the solvated electron Li,$NH_3$ solution. Suitable thicknesses for current collector 14 are generally from about 0.1 mm to about 1.0 cm, depending upon the overall cell geometry and configuration.

Solid lithium ion conducting electrolyte 13 is provided in the embodiment shown in FIG. 1 contacting solvated electron negative electrode 11 and positive electrode compartment 12. Suitable lithium ion conducting solid electrolytes for use in the cell of this invention are known to the art, and may comprise ternary systems such as LiI-$Li_2$S-$SiS_2$; LiI-$Li_2$S-$P_2S_5$; LiI-$Li_2$S-$B_2S_3$; $Li_2$O-$SiO_2$-$P_2O_5$; LiI-$Li_2$S-$As_2S_3$; LiBr-$Li_2$S-$SiS_2$; LiX-$Li_2$O-$B_2O_3$ where X=Cl or Br$^-$; binary systems such as $Li_2$O-$B_2O_3$; other solid electrolytes such as LiAlSiO$_4$; Li$_7$BiO$_4$; Li$_8$SnO$_6$; Li$_8$HfO$_6$; Li$_8$CeO$_6$; Li$_8$ZrO$_6$; Li$_7$NbO$_6$; Li$_7$TaO$_6$; Li$_6$In$_2$O$_6$; LiI, LiCl, LiF, and Li$_4$SiO$_4$ (containing 9 and 50 m/o Li$_3$PO$_4$); lithium ion conducting beta- and beta-"aluminas; and any other lithium ion conducting solid electrolyte having similar properties. An especially preferred solid electrolyte comprises 0.3 m/o LiI-0.42 m/o Li$_2$S-0.28 m/o SiS$_2$.

Positive electrode compartment 12 comprises lithium ion conducting liquid electrolyte 15 and solid positive electrode 16. Suitable lithium ion conducting liquid electrolytes generally comprise a lithium ion conducting supporting electrolyte dissolved in a non-aqueous solvent. Suitable non-aqueous solvents for use in non-aqueous lithium ion conducting electrolyte 15 may include tetrahydrofuran and its derivatives; propylene carbonate; acetonitrile; 1,3 dioxalane N-methyl-2-pyrrolidone; sulpholane; methylformate; dimethyl sulfate; γ-butyrolactone; 1,2-dimethoxyethane; and other non-aqueous solvents which are known to the art which exhibit similar properties. Suitable supporting electrolytes for use in non-aqueous lithium ion conducting electrolyte 15 in combination with a suitable solvent may comprise LiCF$_3$SO$_3$; LiAsF$_6$; LiClO$_4$; LiAlCl$_4$; LiGaCl$_4$; LiBF$_4$; LiCl; and other supporting electrolytes which are known to the art which exhibit similar properties.

Suitable solid positive electrodes 16, according to the embodiment shown in FIG. 1, may comprise TiS$_2$; ZrS$_2$; ZrSe$_2$; VSe$_2$; V$_2$S$_5$; Fe$_{0.25}$V$_{0.75}$S$_2$; Cr$_{0.75}$V$_{0.25}$S$_2$; Cr$_{0.5}$V$_{0.5}$S$_2$; NbS$_3$; NiPS$_3$; FeOCl; UO$_2$F$_2$; NbSe$_3$; MoS$_3$; CuS; Cr$_3$O$_8$; V$_6$O$_{13}$ (stoichiometric); V$_6$O$_{13}$ (non-stoichiometric); TaS$_2$; MoS$_2$; MoSe$_2$; WS$_2$; WSe$_2$; and the like. Positive electrodes 19 comprising TiS$_2$ are especially preferred. TiS$_2$ positive electrodes may also comprise a Teflon/graphite/TiS$_2$ mixture. A current collector, such as a nichrome wire, is preferably attached to solid positive electrode 16.

One especially preferred cell configuration according to this embodiment is provided with a solvated electron lithium negative electrode comprising lithium dissolved in liquid ammonia contacting lithium ion conducting solid electrolyte having the stoichiometry 0.3 m/o LiI-0.42 m/o Li$_2$S-0.28 m/o SiS$_2$, liquid non-aqueous electrolyte comprising propylene carbonate solvent with LiCF$_3$SO$_3$ supporting electrolyte and a solid lithium intercalating TiS$_2$ positive electrode.

According to another embodiment of the present invention shown schematically in FIG. 2, liquid positive electroactive material 17 is providing contact to lithium ion conducting solid electrolyte 13. This embodiment utilizes a solvated electron lithium negative electrode in combination with liquid positive electroactive material. Suitable positive electroactive materials comprise a liquid depolarizing agent such as SO$_2$, SO$_2$Cl or SOCl$_2$ and a lithium ion conducting supporting electrolyte dissolved in a non-aqueous solvent. In a preferred embodiment, liquid positive electroactive material 17 incorporates a dissolved transition metal halide, such as CuCl$_2$. Current collector 18 is preferably provided in liquid positive electroactive material 17. Suitable current collectors 18 are known to the art and may comprise graphitized carbon, for example. One especially preferred cell configuration according to this embodiment is provided with a solvated electron lithium negative electrode comprising lithium dissolved in liquid ammonia contacting solid lithium ion conducting electrolyte comprising 0.3 m/o LiI-0.42 m/o Li$_2$S-0.28 m/o SiS$_2$, and positive electroactive material comprising liquid depolarizing agent SO$_2$ with dissolved CuCl$_2$, supporting electrolyte LiCF$_3$SO$_3$ dissolved in acetonitrile solvent, and a graphitized carbon current collector.

High energy density cell 10 according to the present invention may be conformed to a variety of battery geometries, such as prismatic, filter press, tubular and circular, which are known to the art. FIGS. 3 and 4 illustrate embodiments of the present invention having an enclosed cell configuration. FIG. 3 illustrates a cell of the type shown in FIG. 1 utilizing a solid positive electrode, and FIG. 4 illustrates a cell of the type shown in FIG. 2 utilizing liquid positive electroactive material. Cell housing 20 is provided as a closed container and comprises a material which is electronically conductive and provides current collection from the negative electrodes. Stainless steel is a preferred material for cell housing 20. Solvated electron Li,$NH_3$ solution electrode 11 is provided in the enclosed space between cell housing 20 and solid lithium ion conducting electrolyte 13. In the embodiment of FIG. 3, non-aqueous lithium conducting electrolyte 15 is provided in the enclosed space between solid electrolyte 13 and solid positive electrode 16. In the embodiment of FIG. 4, liquid positive electroactive material 17 is provided in the enclosed space formed by solid electrolyte 13, and preferably comprises a liquid depolarizing agent, a dissolved transition metal halide and a lithium ion conducting supporting electrolyte dissolved in non-aqueous solvent. Current collector 18 is preferably provided to collect current from liquid positive electroactive material 17. Liquid ammonia inlet 21, vent 22 serving as an ammonia vent and a lithium addition port, and positive electrode feed through means 23 providing a seal from the atmosphere, are shown in both embodiments. Liquid depolarizing agent inlet 25 and liquid depolarizing agent vent 24 are shown in the embodiment of FIG. 4. Suitable and preferred components for the embodiments shown in FIGS. 3 and 4 are disclosed in the description of FIGS. 1 and 2. Cells of the type shown in FIGS. 3 and 4 may also be arranged in a positive grounded embodiment with a central negative electrode, although negative-grounded cells, as shown in FIGS. 3 and 4, are generally less susceptible to corrosion and are, therefore, preferred. The enclosed volume cell configurations shown in FIGS. 3 and 4 are just one example of a preferred cell geometry for the cells of the present invention.

In a preferred embodiment of the present invention, the solvated electron lithium negative electrode is provided in a sealed negative electrode compartment. During electrochemical cell cycling, pressures of about 3 to 8 atm are preferably generated in the negative electrode compartment. Equivalent operating pressures may be applied to the positive electrode compartment. Operating temperatures during pressurized cell cycling are preferably close to ambient temperatures, but operating temperatures may range from about −33° C. to about 50° C.

A plurality of cells may be assembled to provide a lithium-based high power and high energy density rechargeable battery for applications such as electric vehicle propulsion and utility load leveling. Suitable cell containers, such as Teflon polyethylene and other insulating materials are known to the art. The cell container may, in some embodiments, require reinforcement, such as with stainless steel, to withstand pressure. Cells according to the present invention can be electrochemically cycled at current densities up to about 100 mA/cm$^2$.

The following examples set forth specific cell components and their methods of manufacture and specific cell configurations, for the purpose of more fully understanding preferred embodiments of the present invention and are not intended to limit the invention in any way.

EXAMPLE I

A cell of the type shown in FIG. 1 was assembled comprising a solvated electron lithium negative electrode with lithium ion conducting solid electrolyte, a liquid lithium ion conducting non-aqueous electrolyte and a lithium intercalation positive electrode. The solvated electron lithium solution was prepared by initially introducing lithium metal under argon into a negative electrode chamber followed by the addition of liquid ammonia. The solution possessed an initial concentration of about 1.5 M Li. A current collector comprising a pressed graphitized carbon Teflon disc was provided in contact with the solvated electron lithium electrode. The lithium ion conducting solid electrolyte comprised 0.3 m/o LiI-0.42 m/o Li$_2$S-0.28 m/o SiS$_2$ having an ionic conductivity in the range of $10^{-3}$ to $10^{-4}$/$\Omega$ cm at ambient temperatures. The isostatically pressed solid electrolyte was very hygroscopic, and all procedures were performed in an argon atmosphere.

The supporting electrolyte LiCF$_3$SO$_3$ and non-aqueous solvent propylene carbonate comprised the liquid non-aqueous lithium ion conducting electrolyte having the approximate stoichiometry 0.4 M LiCF$_3$SO$_3$,PC. The solid lithium intercalation positive electrode comprised TiS$_2$, and was prepared containing 25$^w$/o Teflon/graphite mixture (in a 2:1 weight ratio). An intimate mixture of graphite (325 mesh) and Teflon (as an aqueous Teflon 30B mixture) was initially formed and water was removed by heating for several hours at 90° C. in the atmosphere. This composite was sintered at 250° C. for 2 hours under argon to cure the Teflon. This material was ground and mixed with TiS$_2$ to achieve the desired stoichiometry using acetonitrile as a mixing agent to make a fine paste. Acetonitrile was removed by heating at 60° C. in the atmosphere for 30 min. Pellets were formed by pressing at 20,000 psi. Current collection to the TiS$_2$ electrode was achieved either by inserting a coiled nichrome wire into the bulk of the powder mixture prior to pressing, or by attaching a nichrome wire directly after pressing using graphoxy cement.

A cell having the following overall configuration was thus assembled:

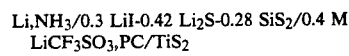

The initial open-circuit potential (OCP) for this cell was about 2.2 V, and the cell was electrochemically reversible at current densities of about 0.06 mA/cm$^2$ and 0.1 mA/cm$^2$. It is expected that cells having a similar configuration but operating under pressure will be electrochemically cycled at current densities up to 100 mA/cm$^2$. There was no observable deterioration upon extended cell cycling.

EXAMPLE II

A cell of the general type shown in FIG. 2 was assembled comprising a solvated electron lithium electrode with lithium ion conducting solid electrolyte and liquid lithium ion conducting positive electroactive material. The solvated electron lithium electrode was prepared as in Example I. The lithium ion conducting solid electrolyte comprised isostatically pressed 0.3 m/o LiI-0.42 m/o Li$_2$S-0.28 m/o SiS$_2$. All procedures utilizing this solid electrolyte were performed under argon. The positive electroactive material comprised the supporting electrolyte LiCF$_3$SO$_3$ dissolved in acetonitrile with the dissolved metal halide CuCl$_2$ in SO$_2$ liquid depolarizing agent. A graphitized carbon current collector was provided in the positive electrode compartment and was prepared containing 10 $^w$/o Teflon initially introduced as Teflon 30B followed by curing at 220° C. for several hours.

A cell having the following overall configuration was thus assembled:

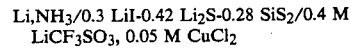

in 70 $^w$/o SO$_2$, 30 $^w$/o CH$_3$CN/C. The cell was found to readily accept a charge current and be completely electrochemically reversible at current densities of about 0.4 mA/cm$^2$ and 0.8 mA/cm$^2$. An open-circuit potential of about 3.3 V was achieved.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A rechargeable high energy density lithium-based cell comprising:
   a solvated electron lithium negative electrode comprising a solution of lithium dissolved in liquid ammonia;
   a lithium ion conducting solid electrolyte contacting said negative electrode;
   a liquid non-aqueous lithium ion conducting electrolyte comprising a lithium ion conducting supporting electrolyte dissolved in a non-aqueous solvent, said liquid electrolyte contacting said lithium ion conducting solid electrolyte; and
   a solid lithium intercalation positive electrode contacting said liquid electrolyte.

2. A rechargeable high energy density lithium-based cell according to claim 1 wherein the concentration of said lithium in said liquid ammonia is about 0.1 M to about 7.75M.

3. A rechargeable high energy density lithium-based cell according to claim 1 wherein said lithium in said liquid ammonia is about 1.0 M to about 3.5 M.

4. A rechargeable high energy density lithium-based cell according to claim 1 additionally comprising a current collector at said negative electrode.

5. A rechargeable high energy density lithium-based cell according to claim 1 wherein said lithium ion conducting solid electrolyte is selected from the group consisting of: $LiI-Li_2S-SiS_2$; $LiI-Li_2S-P_2S_5$; $LiI-Li_2S-B_2S_3$; $Li_2O-SiO_2-P_2O_5$; $LiI-Li_2S-As_2S_3$; $LiBr-Li_2S-SiS_2$; $LiX-Li_2O-B_2O_3$ where $X=Cl$ or $Br^-$; $Li_2O-B_2O_3$; $LiAlSiO_4$; $Li_7BiO_4$; $Li_8SnO_6$; $Li_8HfO_6$; $Li_8CeO_6$; $Li_8ZrO_6$; $Li_7NbO_6$; $Li_7TaO_6$; $Li_6In_2O_6$; $LiI$; $LiCl$; $LiF$; and $Li_4SiO_4$ (containing 9 and 50 m/o $Li_3PO_4$); and lithium ion conducting beta- and beta"-aluminas.

6. A rechargeable high energy density lithium-based cell according to claim 1 wherein said lithium ion conducting solid electrolyte comprises 0.3 m/o LiI-0.42 m/o $Li_2S$-0.28 m/o $SiS_2$.

7. A rechargeable high energy density lithium-based cell according to claim 1 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and LiCl; and said non-aqueous solvent is selected from the group consisting of: tetrahydrofuran and its derivatives; propylene carbonate; acetonitrile; 1,3-dioxalane; N-methyl-2-pyrrolidone; sulpholane; methylformate; dimethylsulfate; $\gamma$-butyrolactone; and 1,2 dimethoxyethane.

8. A rechargeable high energy density lithium-based cell according to claim 1 wherein said lithium intercalation positive electrode is selected from the group consisting of: $TiS_2$; $ZrS_2$; $ZrSe_2$; $VSe_2$; $V_2S_5$; $Fe_{0.25}V_{0.75}S_2$; $Cr_{0.75}V_{0.25}S_2$; $Cr_{0.5}V_{0.5}S_2$; $NbS_3$; $NiPS_3$; $FeOCl$; $UO_2F_2$; $NbSe_3$; $MoS_3$; $CuS$; $Cr_3O_8$; $V_6O_{13}$ (stoichiometric); $V_6O_{13}$ (non-stoichiometric); $TaS_2$; $MoS_2$; $MoSe_2$; $WS_2$; and $WSe_2$.

9. A rechargeable high energy density lithium-based cell according to claim 8 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and LiCl; and said non-aqueous solvent is selected from the group consisting of: tetrahydrofuran and its derivatives; propylene carbonate; acetonitrile; 1,3-dioxalane; N-methyl-2-pyrrolidone; sulpholane; methylformate; dimethylsulfate; $\gamma$-butyrolactone; and 1,2 dimethoxyethane.

10. A rechargeable high energy density lithium-based cell according to claim 9 wherein said lithium ion conducting solid electrolyte is selected from the group consisting of: $LiI-Li_2S-SiS_2$; $LiI-Li_2S-P_2S_5$; $LiI-Li_2S-B_2S_3$; $Li_2O-SiO_2-P_2O_5$; $LiI-Li_2S-As_2S_3$; $LiBr-Li_2S-SiS_2$; $LiX-Li_2O-B_2O_3$ where $X=Cl$ or $Br^-$; $Li_2O-B_2O_3$; $LiAlSiO_4$; $Li_7BiO_4$; $Li_8SnO_6$; $Li_8HfO_6$; $Li_8CeO_6$; $Li_8ZrO_6$; $Li_7NbO_6$; $Li_7TaO_6$; $Li_6In_2O_6$; $LiI$, $LiCl$, $LiF$, and $Li_4SiO_4$ (containing 9 and 50 m/o $Li_3PO_4$); and lithium ion conducting beta- and beta"-aluminas.

11. A rechargeable high energy density lithium-based cell according to claim 10 wherein said solution of lithium dissolved in liquid ammonia is provided in a sealed negative electrode compartment.

12. A rechargeable high energy density lithium-based cell according to claim 1 wherein said solution of lithium dissolved in liquid ammonia is provided in a sealed negative electrode compartment.

13. A rechargeable high energy density lithium-based cell comprising:
   a solvated electron lithium negative electrode comprising a solution of lithium dissolved in liquid ammonia;
   lithium ion conducting solid electrolyte contacting said negative electrode;
   liquid non-aqueous lithium ion conducting positive electroactive material comprising a lithium ion conducting supporting electrolyte dissolved in a non-aqueous solvent and a liquid depolarizing agent contacting said lithium ion conducting solid electrolyte.

14. A rechargeable high energy density lithium-based cell according to claim 13 additionally comprising a current collector contacting said positive electroactive material.

15. A rechargeable high energy density lithium-based cell according to claim 13 wherein said lithium ion conducting solid electrolyte is selected from the group consisting of: $LiI-Li_2S-SiS_2$; $LiI-Li_2S-P_2S_5$; $LiI-Li_2S-B_2S_3$; $Li_2O-SiO_2-P_2O_5$; $LiI-Li_2S-As_2S_3$; $LiBr-Li_2S-SiS_2$; $LiX-Li_2O-B_2O_3$ where $X=Cl$ or $Br^-$; $Li_2O-B_2O_3$; $LiAlSiO_4$; $Li_7BiO_4$; $Li_8SnO_6$; $Li_8HfO_6$; $Li_8CeO_6$; $Li_8ZrO_6$; $Li_7NbO_6$; $Li_7TaO_6$; $Li_6In_2O_6$; $LiI$, $LiCl$, $LiF$, and $Li_4SiO_4$ (containing 9 and 50 m/o $Li_3PO_4$); and lithium ion conducting beta- and beta"-aluminas.

16. A rechargeable high energy density lithium-based cell according to claim 13 wherein said lithium ion conducting solid electrolyte comprises 0.3 m/o LiI-0.42 m/o $Li_2S$-0.28 m/o $SiS_2$.

17. A rechargeable high energy density lithium-based cell according to claim 13 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and LiCl; and said non-aqueous solvent is selected from the group consisting of: tetrahydrofuran and its derivatives; propylene carbonate; acetonitrile; 1,3-dioxalane; N-methyl-2-pyrrolidone; sulpholane; methylformate; dimethylsulfate; $\gamma$-butyrolactone; and 1,2 dimethoxyethane; and said liquid depolarizing agent is selected from the group consisting of: $SO_2$; $SO_2Cl_2$; and $SOCl_2$.

18. A rechargeable high energy density lithium-based cell according to claim 13 wherein said lithium intercalation positive electrode is selected from the group consisting of: $TiS_2$; $ZrS_2$; $ZrSe_2$; $VSe_2$; $V_2S_5$; $Fe_{0.25}V_{0.75}S_2$; $Cr_{0.75}V_{0.25}S_2$; $Cr_{0.5}V_{0.5}S_2$; $NbS_3$; $NiPS_3$; $FeOCl$; $UO_2F_2$; $NbSe_3$; $MoS_3$; $CuS$; $Cr_3O_8$; $V_6O_{13}$ (stoichiometric); $V_6O_{13}$ (non-stoichiometric); $TaS_2$; $MoS_2$; $MoSe_2$; $WS_2$; and $WSe_2$.

19. A rechargeable high energy density lithium-based cell according to claim 1 wherein the concentration of said lithium in said liquid ammonia is about 0.1 M to about 7.75 M.

20. A rechargeable high energy density lithium-based cell according to claim 13 wherein said lithium in said liquid ammonia is about 1.0 M to about 3.5 M.

21. A rechargeable high energy density lithium-based cell according to claim 13 wherein said positive electroactive material additionally comprises a dissolved transition metal halide.

22. A rechargeable high energy density lithium-based cell according to claim 21 wherein said dissolved transition metal halide comprises $CuCl_2$.

23. A rechargeable high energy density lithium-based cell according to claim 22 additionally comprising a current collector at said negative electrode.

24. A rechargeable high energy density lithium-based cell according to claim 23 wherein said lithium ion conducting solid electrolyte is selected from the group consisting of: $LiI-Li_2S-SiS_2$; $LiI-Li_2S-P_2S_5$; $LiI-Li_2S-B_2S_3$; $Li_2O-SiO_2-P_2O_5$; $LiI-Li_2S-As_2S_3$; $LiBr-Li_2S-SiS_2$; $LiX-Li_2O-B_2O_3$ where $X=Cl$ or $Br-$; $Li_2O-B_2O_3$; $LiAlSiO_4$; $Li_7BiO_4$; $Li_8SnO_6$; $Li_8HfO_6$; $Li_8CeO_6$; $Li_8ZrO_6$; $Li_7NbO_6$; $Li_7TaO_6$; $Li_6In_2O_6$; $LiI$, $LiCl$, $LiF$, and $Li_4SiO_4$ (containing 9 and 50 m/o $Li_3PO_4$; and lithium ion conductinb beta- and beta''-aluminas.

25. A rechargeable high energy density lithium-based cell according to claim 24 wherein said lithium ion conducting solid electrolyte comprises 0.3 m/o $LiI$-0.42 m/o $Li_2S$-0.28 m/o $SiS_2$.

26. A rechargeable high energy density lithium-based cell according to claim 25 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and $LiCl$; and said non-aqueous solvent is selected from the group consisting of: tetrahydrofuran and its derivatives; propylene carbonate; acetonitrile; 1,3-dioxalane; N-methyl-2-pyrrolidone; sulpholane; methylformate; dimethylsulfate; $\gamma$-butyrolactone; and 1,2 dimethoxyethane; and said liquid depolarizing agent is selected from the froup consisting of: $SO_2$; $SO_2Cl_2$; and $SOCl_2$.

27. A rechargeable high energy density lithium-based cell according to claim 26 wherein said lithium intercalation positive electrode is selected from the group consisting of: $TiS_2$; $ZrS_2$; $ZrSe_2$; $VSe_2$; $V_2S_5$; $Fe_{0.25}V_{0.75}S_2$; $Cr_{0.75}V_{0.25}S_2$; $Cr_{0.5}V_{0.5}S_2$; $NbS_3$; $NiPS_3$; $FeOCl$; $UO_2F_2$; $NbSe_3$; $MoS_3$; $CuS$; $Cr_3O_8$; $V_6O_{13}$ (stoichiometric); $V_6O_{13}$ (non-stoichiometric); $TaS_2$; $MoS_2$; $MoSe_2$; $WS_2$; and $WSe_2$.

28. A rechargeable high energy density lithium-based cell according to claim 27 wherein the concentration of said lithium in said liquid ammonia is about 0.1 M to about 7.75 M.

29. A rechargeable high energy density lithium-based cell according to claim 28 wherein said solution of lithium dissolved in liquid ammonia is provided in a sealed negative electrode compartment.

30. A rechargeable high energy density lithium-based cell according to claim 13 wherein said solution of lithium dissolved in liquid ammonia is provided in a sealed negative electrode compartment.

* * * * *